United States Patent
Hsu

(10) Patent No.: US 9,481,128 B2
(45) Date of Patent: Nov. 1, 2016

(54) PACKAGE BAG SEALING MACHINE

(71) Applicant: CHAN LI MACHINERY CO., LTD., Taoyuan (TW)

(72) Inventor: Chi Pin Hsu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 596 days.

(21) Appl. No.: 13/975,536

(22) Filed: Aug. 26, 2013

(65) Prior Publication Data

US 2014/0262050 A1 Sep. 18, 2014

(30) Foreign Application Priority Data

Mar. 12, 2013 (TW) .............................. 102108641 A

(51) Int. Cl.
*B32B 37/00* (2006.01)
*B29C 65/02* (2006.01)
*B65B 51/14* (2006.01)
*B65B 61/00* (2006.01)
*B29C 65/74* (2006.01)
*B29C 65/00* (2006.01)

(52) U.S. Cl.
CPC ............. *B29C 65/02* (2013.01); *B65B 51/14* (2013.01); *B29C 65/7451* (2013.01); *B29C 66/1122* (2013.01); *B29C 66/3432* (2013.01); *B29C 66/4312* (2013.01); *B29C 66/83221* (2013.01); *B29C 66/849* (2013.01); *B65B 61/005* (2013.01); *Y10T 156/12* (2015.01)

(58) Field of Classification Search
CPC .............................. B29C 65/02; B65B 51/14
USPC .............................. 156/358, 580, 581, 583.1
See application file for complete search history.

(56) References Cited

U.S. PATENT DOCUMENTS

| | | | | |
|---|---|---|---|---|
| 4,167,435 A | * | 9/1979 | Olschewski | B29C 65/18 100/272 |
| 7,290,580 B2 | * | 11/2007 | Naitoh | B29C 70/72 156/285 |
| 7,513,286 B2 | * | 4/2009 | Recchia, Jr. | B29C 65/18 156/515 |

FOREIGN PATENT DOCUMENTS

| | | |
|---|---|---|
| CN | 201816766 U | 5/2011 |
| CN | 201834259 U | 5/2011 |
| TW | 416922 | 1/2001 |
| TW | 262446 M | 4/2005 |

* cited by examiner

Primary Examiner — James Sells
(74) Attorney, Agent, or Firm — Rosenberg, Klein & Lee

(57) ABSTRACT

A package bag sealing machine includes a first clamping unit and a second clamping unit respectively connected to a first bracket and a second bracket and movable relative to each other to clamp a package bag therebetween, a first sealing unit, a second sealing unit connected to the second bracket, and a first drive connecting the first sealing unit to the first bracket and controllable to move the first sealing unit toward the second sealing unit for sealing a package bag between the first sealing unit and the second sealing unit. After the first clamping unit and the second clamping unit clamp the package bag to be sealed, they are immovable, preventing stretching the package bag during the sealing operation and increasing the packaging yield.

11 Claims, 9 Drawing Sheets

PACKAGE BAG SEALING MACHINE

TECHNICAL FIELD

The present invention relates to package bag sealing technology and more particularly, to a package bag sealing machine, which prevents from stretching the package bag during the package bag clamping and heat sealing processes, enhancing the sealing yield.

DESCRIPTION OF THE PRIOR ART

Referring to FIG. 1, a front view of a conventional package bag sealing machine is illustrated. As illustrated, the package bag sealing machine 10 comprises an upper transverse frame 111, a lower transverse frame 113, an upper clamping unit 131, a lower clamping unit 133, an upper heat sealing unit 151, a lower heat sealing unit 153, and at least one retracting unit 17. The upper clamping unit 131 is connected to the upper transverse frame 111 by the at least one retracting unit 17. The upper heat sealing unit 151 is fixedly mounted at the upper transverse frame 111.

The upper clamping unit 131 and the lower clamping unit 133 are arranged facing toward each other. Further, the upper transverse frame 111 and the lower transverse frame 113 can be driven to move the upper clamping unit 131 and the lower clamping unit 133 relative to each other, forcing the upper clamping unit 131 and the lower clamping unit 133 to clamp the package bag 12 therebetween. When the upper clamping unit 131 and the lower clamping unit 133 are moved into contact with each other, the upper transverse frame 111 and the lower transverse frame 113 will keep moving the upper clamping unit 131 and the lower clamping unit 133, causing the upper clamping unit 131 to impart a pressure to the retracting unit 17 and to further shorten the length of the retracting unit 17.

Referring also to FIGS. 2A to 2C, at first, the upper clamping unit 131 and the lower clamping unit 133 are moved apart, leaving a gap 14 therebetween, enabling the package bag 12 to be moved through the gap 14 between the upper clamping unit 131 and the lower clamping unit 133, as shown in FIG. 2A.

When the package bag 12 is delivered to a predetermined location, the upper transverse frame 111 and the lower transverse frame 113 are controlled to carry the upper clamping unit 131 and the lower clamping unit 133 toward each other, forcing the upper clamping unit 131 and the lower clamping unit 133 to clamp the package bag 12 therebetween, as shown in FIG. 2B.

After the upper clamping unit 131 and the lower clamping unit 133 clamped the package bag 12 therebetween, the upper transverse frame 111 keeps carrying the upper clamping unit 131 toward the lower clamping unit 133, and the lower transverse frame 113 keeps carrying the lower clamping unit 133 toward the upper clamping unit 131. At this time, the lower clamping unit 133 imparts a pressure to the upper clamping unit 131 and the retracting unit 17, forcing the retracting unit 17 to retract and to shorten its length.

The upper clamping unit 131 is connected to the upper transverse frame 111 through the retracting unit 17. Therefore, when the retracting unit 17 shortens its length, the upper clamping unit 131 is moved backwardly toward the upper transverse frame 111. Further, the upper heat sealing unit 151 and the upper clamping unit 131 are disposed adjacent to each other and connected to the upper transverse frame 111. When the upper clamping unit 131 is being moved backwardly toward the upper transverse frame 111, the upper heat sealing unit 151 is being gradually exposed out of the upper clamping unit 131, enabling the upper heat sealing unit 151 and the lower heat sealing unit 153 to touch the package bag 12 therebetween and the seal the package bag 12, as shown in FIG. 2C.

The aforesaid package bag sealing machine 10 can effectively seal a package bag 12. However, because the upper clamping unit 131 and the lower clamping unit 133 are being continuously moved after they clamped the package bag 12, causing the package bag 12 to be stretched. Thus, the package bag sealing position will be deviated from the predetermined position, for example, deviated from the center line 121 of the package bag 12, as shown in FIG. 2C, and the package bag 12 can be damaged easily when it is stretched, lowering the packaging yield.

SUMMARY OF THE PRESENT INVENTION

It is, therefore, the main object of the present invention to provide a package bag sealing machine, which comprises a first clamping unit and a second clamping unit respectively affixed to a first bracket and a second bracket, a first sealing unit and a second sealing unit for sealing a package bag, wherein the first clamping unit and the second clamping unit are stopped from movement after clamped a package bag therebetween for sealing by the first sealing unit and the second sealing unit, preventing the package bag from being stretched and damaged by the first clamping unit and the second clamping unit during the sealing operation.

It is another object of the present invention to provide a package bag sealing machine, which further comprises a first bracket and a second bracket adapted to hold the first clamping unit and the second clamping unit respectively, and a first drive unit connecting the first sealing unit to the first bracket and adapted to move the first sealing unit toward the package bag after the first clamping unit and the second clamping unit clamp the package bag, enabling the package bag to be positively sealed by the first sealing unit and the second sealing unit, wherein the first clamping unit and the second clamping unit are maintained immovable when the package bag is being sealed by the first sealing unit and the second sealing unit, keeping the package bag sealing position in line with the center line of the package bag.

To achieve these and other objects of the present invention, the present invention provides a package bag sealing machine, comprising: a first bracket; a second bracket facing toward the first bracket; a first clamping unit connected to the first bracket; a second clamping unit connected to the second bracket and facing toward the first clamping unit for clamping a package bag between the first clamping unit and the second clamping unit; a first sealing unit; a second sealing unit connected to the second bracket or the second clamping unit and facing toward the first sealing unit; and at least one first drive unit connected to the first sealing unit and the first bracket and adapted for moving the first sealing unit relative to the first bracket and the second sealing unit.

In one embodiment of the bag sealing machine, further comprises at least one first buffer unit adapted to connect the first clamping unit and the first bracket.

In one embodiment of the bag sealing machine, further comprises at least one second buffer unit adapted to connect the second clamping unit and the second bracket.

In one embodiment of the bag sealing machine, further comprises at least one sliding rail adapted to support the first bracket and the second bracket, enabling the first bracket and the second bracket to be moved along the sliding rail.

In one embodiment of the bag sealing machine, further comprises at least one sliding rail adapted to connect the first bracket and the first sealing unit, enabling the first sealing unit to be moved along the sliding rail relative to the first bracket.

In one embodiment of the bag sealing machine, the first clamping unit and the first sealing unit are disposed adjacent to each other, and the first sealing unit is disposed below the elevation of the first clamping unit.

In one embodiment of the bag sealing machine, the first drive unit is controllable to move the first sealing unit toward the second sealing unit to the extent wherein the first sealing unit is disposed equal to or above the elevation of the first clamping unit.

In one embodiment of the bag sealing machine, further comprises at least one connection unit adapted to connect the first clamping unit and the first bracket.

In one embodiment of the bag sealing machine, further comprises at least one suction unit located at the first clamping unit and the second clamping unit.

In one embodiment of the bag sealing machine, further comprises at least one cutter, and at least one second drive unit connecting the at least one cutter to the second bracket.

In one embodiment of the bag sealing machine, the first drive unit is controllable to move the first sealing unit toward the second sealing unit and to seal a package bag between the first sealing unit and the second sealing unit after the first clamping unit and the second clamping unit clamp a package bag therebetween.

Other advantages and features of the present invention will be fully understood by reference to the following specification in conjunction with the accompanying drawings, in which like reference signs denote like components of structure.

DETAILED DESCRIPTION OF THE PREFERRED EMBODIMENTS

Figure 1:
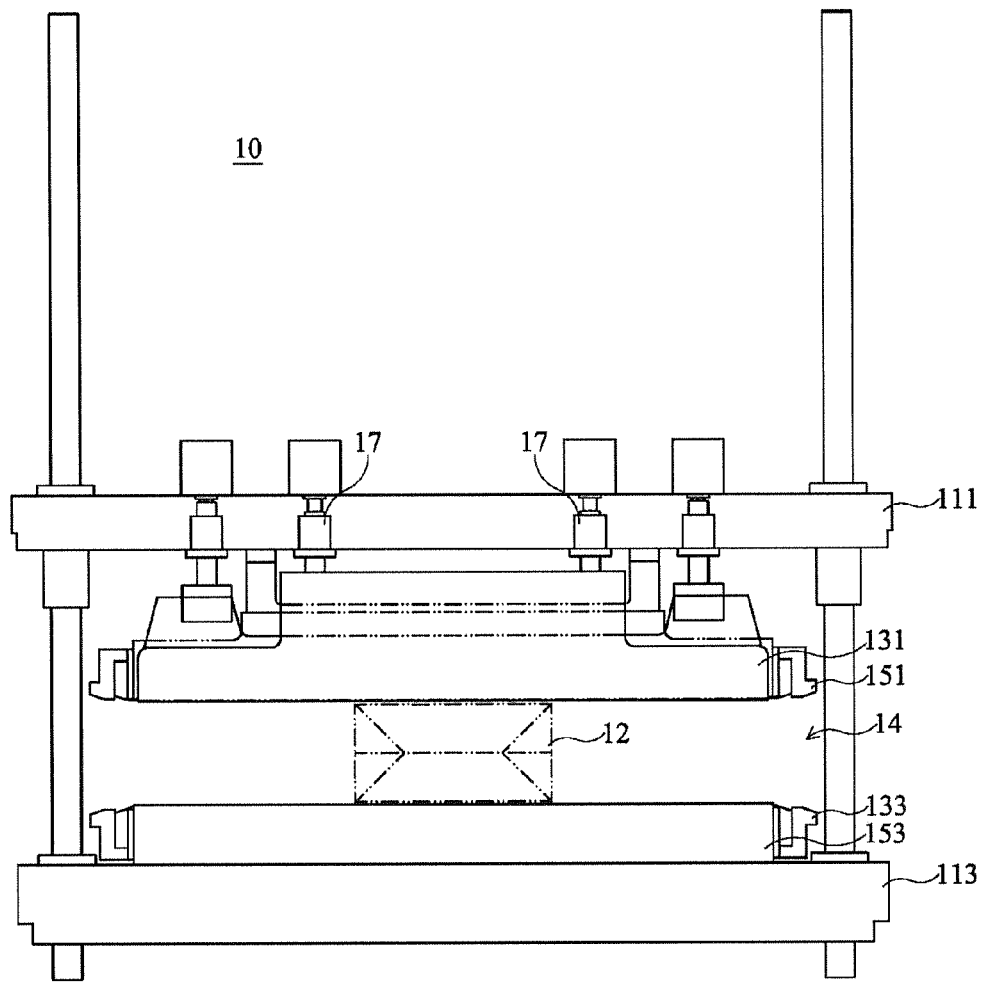
FIG. 1 is a schematic front view of a package bag sealing machine according to the prior art.
Figure 2A:
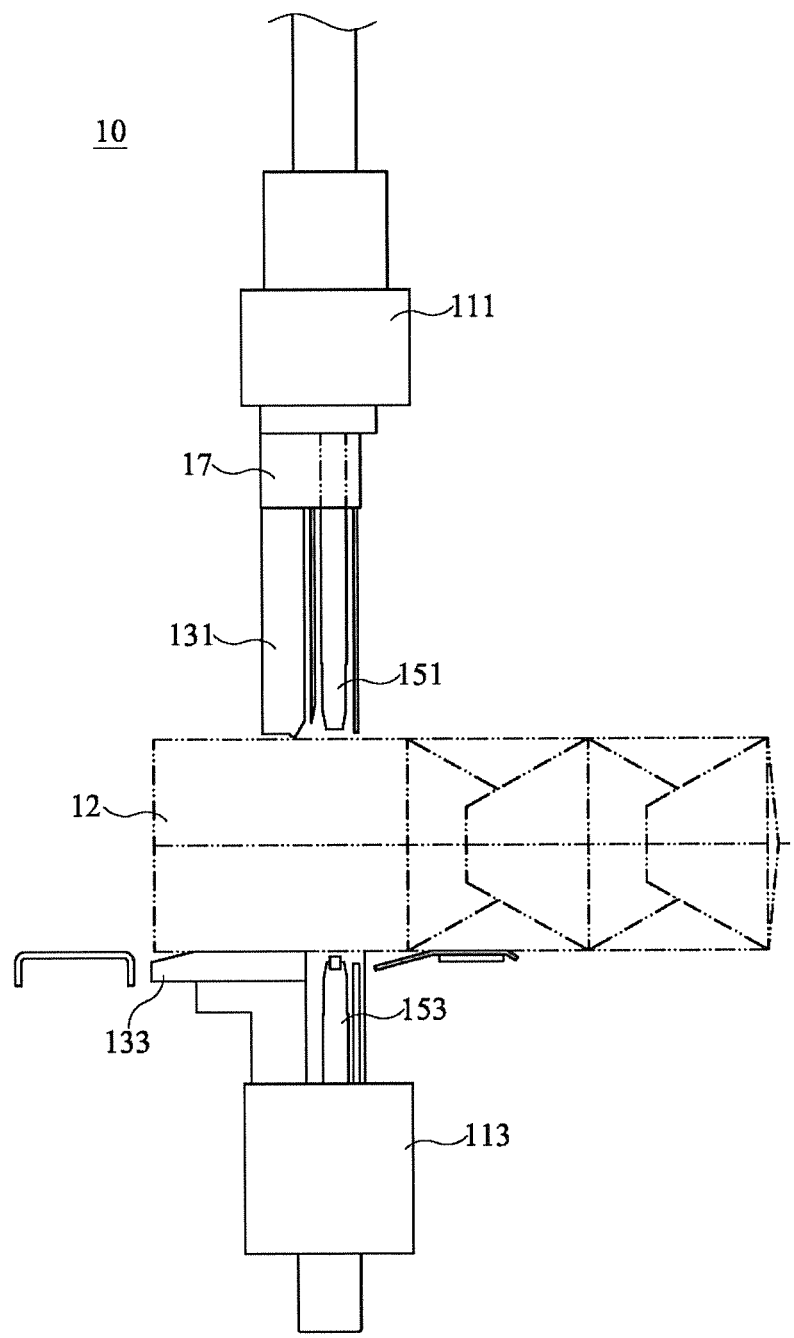
FIGS. 2A-2C are schematic operational views of the package bag sealing machine according to the prior art.
Figure 2B:
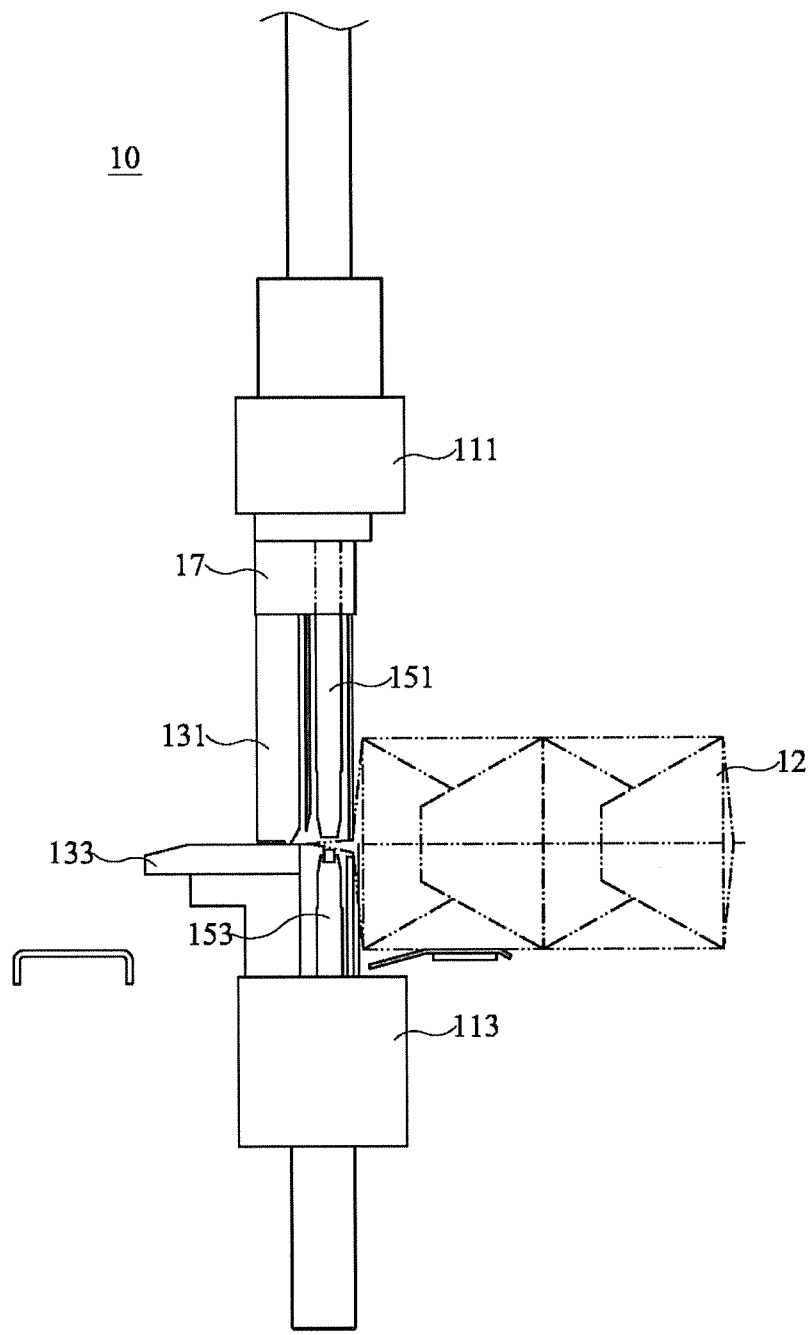
Figure 2C:
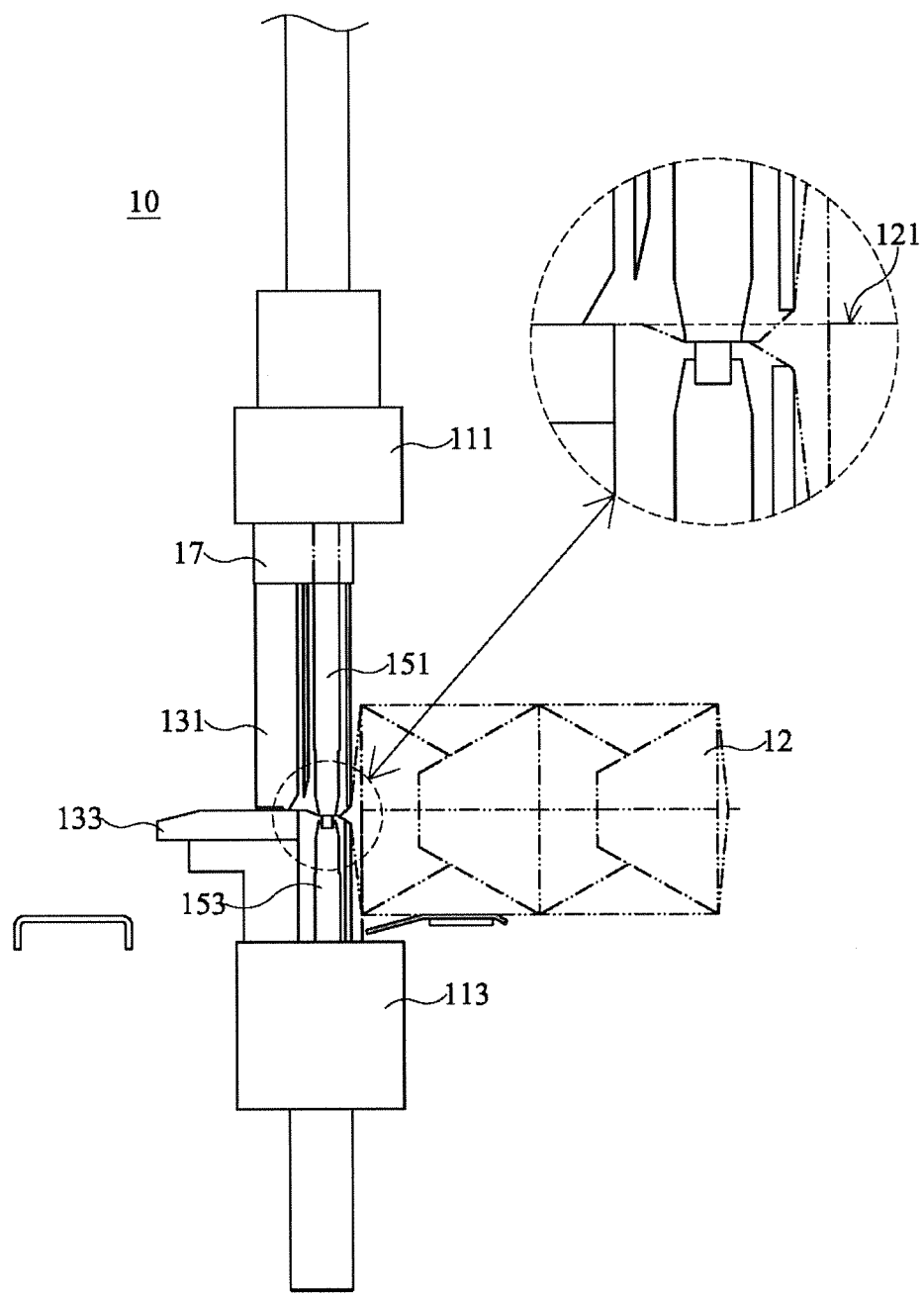
Figure 3:
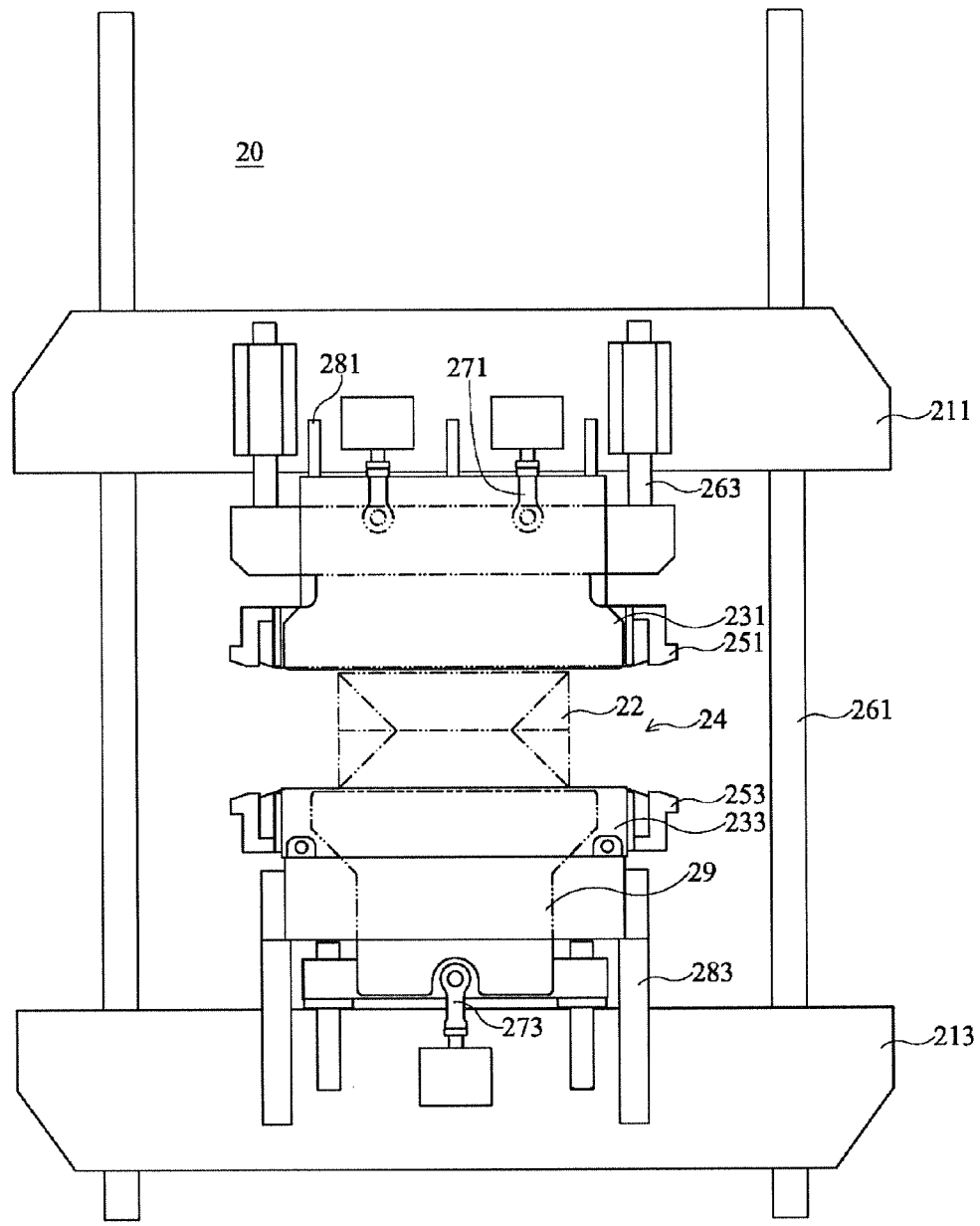
FIG. 3 is a schematic front view of a package bag sealing machine in accordance with the present invention.

Referring to FIG. 3, a front view of a package bag sealing machine in accordance with the present invention is illustrated. As illustrated, the package bag sealing machine 20 comprises a first bracket 211, a second bracket 213, a first clamping unit 231, a second clamping unit 233, a first sealing unit 251, a second sealing unit 253, and a first drive unit 271.

The first bracket 211 and the second bracket 213 are arranged facing toward each other and movable relative to each other. In one embodiment, the first bracket 211 is disposed above the second bracket 213. Further, at least one sliding rail 261 is provide to support the first bracket 211 and the second bracket 213, allowing the first bracket 211 and the second bracket 213 to be respectively moved along the at least one sliding rail 261 to adjust the distance therebetween.

The first clamping unit 231 and the second clamping unit 233 are arranged facing toward each other and adapted to clamp a package bag 22 therebetween, wherein the first clamping unit 231 is connected to the first bracket 211, and the second clamping unit 233 is connected to the second bracket 213. In one embodiment, the first clamping unit 231 is connected to the first bracket 211 by a first connection unit 281, and the second clamping unit 233 is connected to the second bracket 213 by a second connection unit 283.

In one embodiment, the first connection unit 281 and the second connection unit 283 simply provides a connection function without any driving or retracting function. Moving the first bracket 211 and the second bracket 213 can carry the first clamping unit 231 and the second clamping unit 233 to move relative to each other, changing the gap 24 between the first clamping unit 231 and the second clamping unit 233.

The first sealing unit 251 and the second sealing unit 253 are arranged facing toward each other, wherein the first sealing unit 251 is connected to the first bracket 211 through at least one first drive unit 271. Moving the first bracket 211 can cause the first drive unit 271 to move the first sealing unit 251. Further, subject to the arrangement of the first drive unit 271, the first sealing unit 251 can be moved relative to the first bracket 211 and the second sealing unit 253, for example, the first drive unit 271 can drive the first sealing unit 251 to move toward or away from the second sealing unit 253 and/or the second bracket 213.

In order to improve the convenience of using the package bag sealing machine, at least one sliding rail 263 can be provided between the first bracket 211 and the first sealing unit 251, enabling the first drive unit 271 to move the first sealing unit 251 along the at least one sliding rail 263. Further, the second sealing unit 253 can be connected to the second bracket 213 or second clamping unit 233, i.e., the second sealing unit 253 is not movable relative to the second bracket 213 and the second clamping unit 233.

Similarly, the second sealing unit 253 can be connected to the second bracket 213 through a drive unit (not shown) that can be controlled to move the second sealing unit 253 toward the first sealing unit 251, enabling the first sealing unit 251 and the second sealing unit 253 to seal the package bag 22 therebetween.

The package bag sealing machine 20 comprises a cutter 29 adapted for cutting the package bag 22. In one embodiment, the cutter 29 is connected to the second bracket 213 through a second drive unit 273. Moving the second bracket 213 can carry the cutter 29 to move. Subject to the arrangement of the second drive unit 273, the cutter 29 can be moved relative to the second bracket 213, for example, the second drive unit 273 can drive the cutter 29 to move toward or away from the first clamping unit 231, the first sealing unit 251 and/or the first bracket 211, and to cut the package bag 22 that is hold between the first clamping unit 231 and the second clamping unit 233. In another embodiment, the cutter 29 can be connected to the first bracket 211, and driven to cut the package bag 22. Detailed description of the operation of the package bag sealing machine 20 will be explained hereinafter.

Figure 4A:
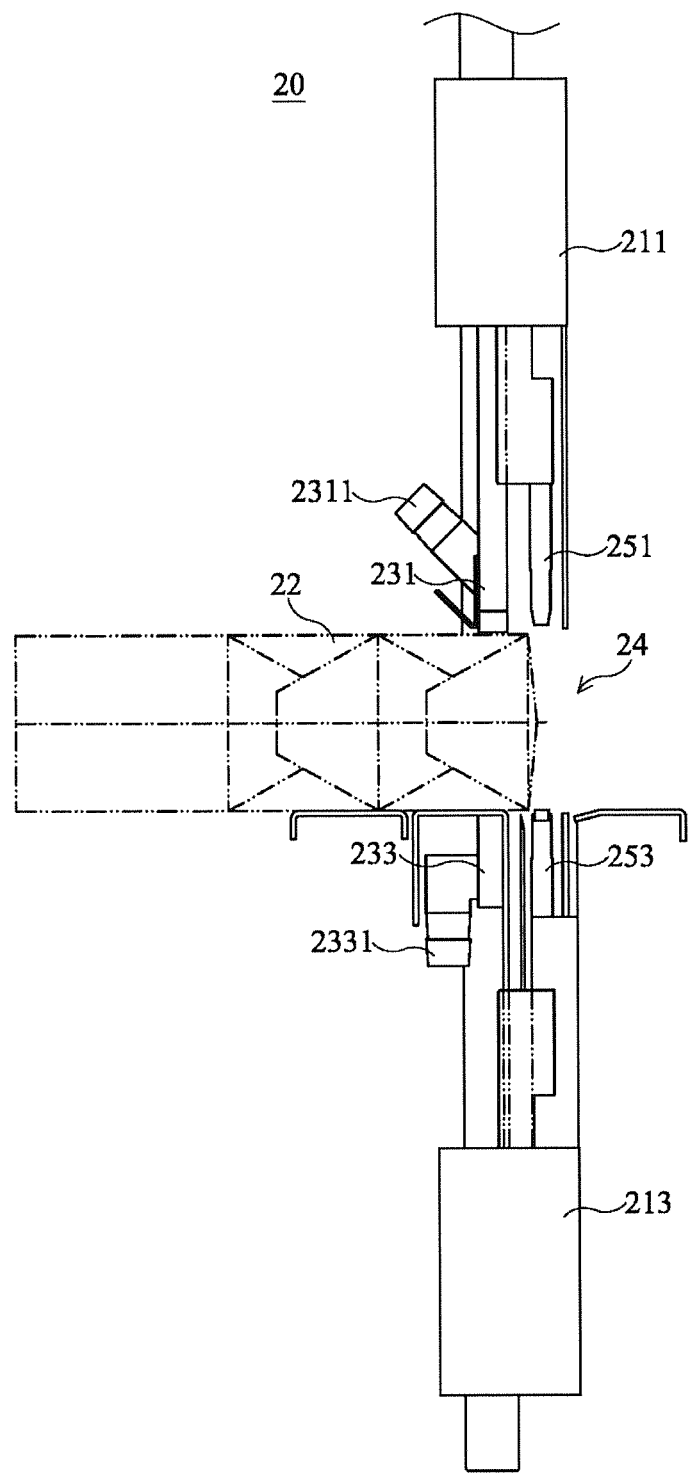
FIGS. 4A-4C are schematic operational views of the package bag sealing machine in accordance with the present invention.
Figure 4B:
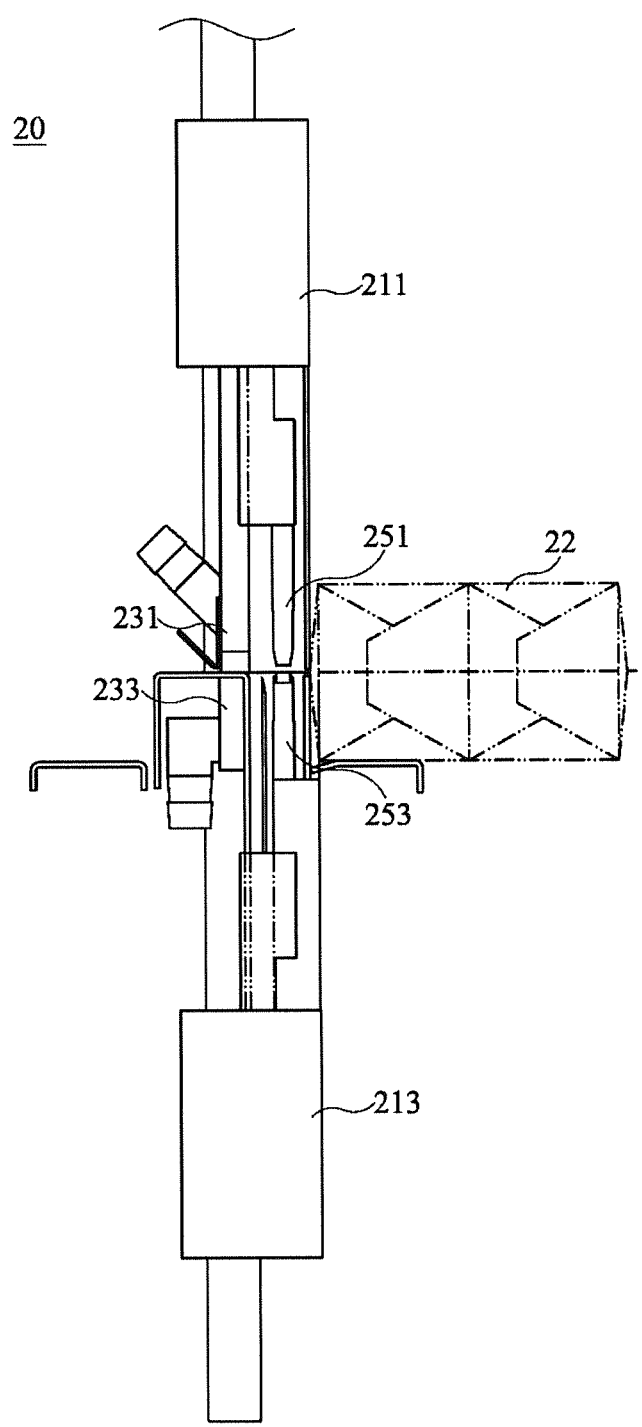
Figure 4C:
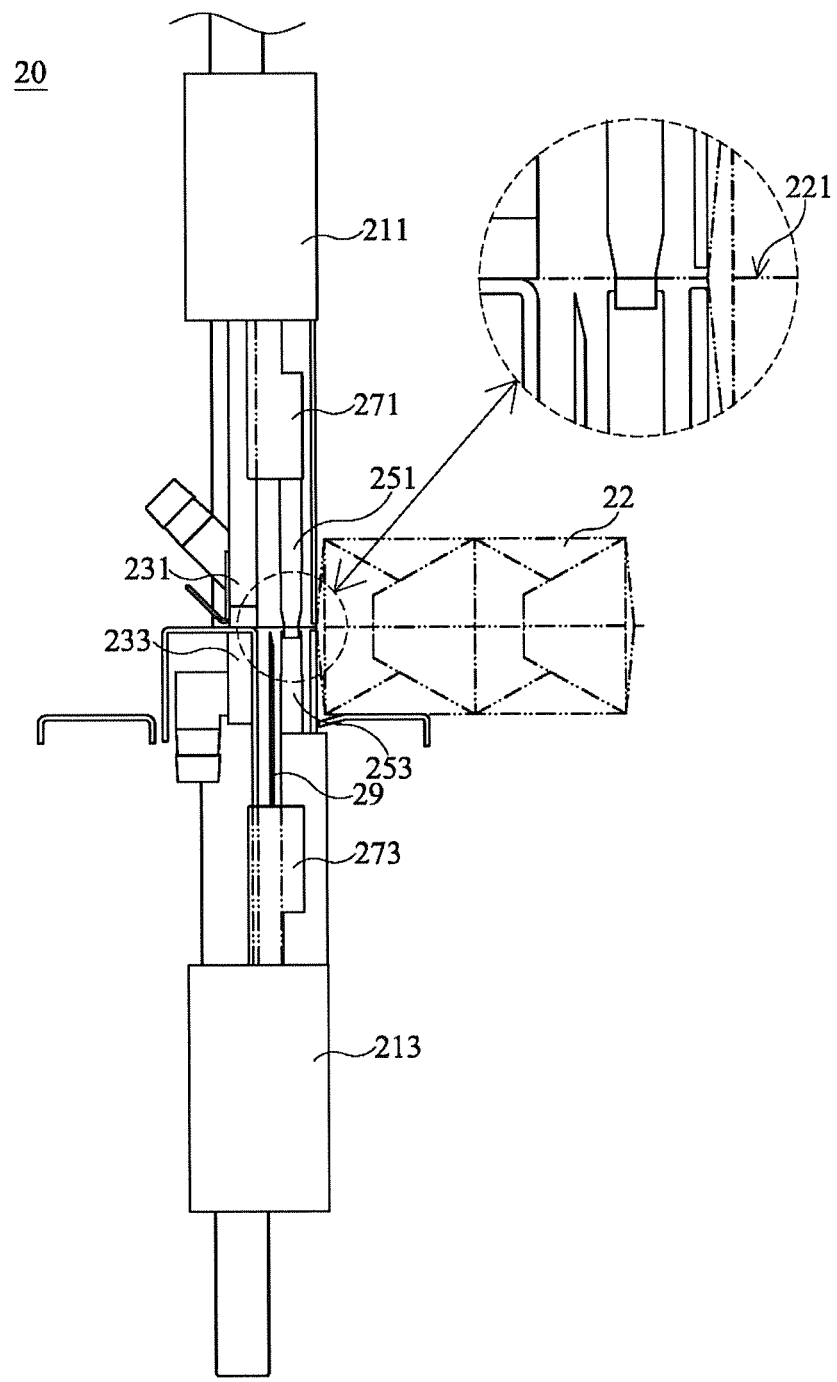

Referring to FIGS. 4A-4C, the sealing operation of the package bag sealing machine to seal a package bag is shown. As illustrated in FIG. 3, the first bracket 211 is driven to carry the first clamping unit 231 and the first sealing unit 251 upward and the second bracket 213 is driven to carry the second clamping unit 233 and the second sealing unit 253 downward, increasing the gap 24 between the first clamping unit 231 and the second clamping unit 233 and allowing the package bag 22 to be transferred into the gap 24 between the first clamping unit 231 and the second clamping unit 233, as shown in FIG. 4A.

Further, in one embodiment, the first clamping unit 231 and the second clamping unit 233 each have a respective suction unit 2311/2331 mounted therein. The suction units 2311/2331 are controllable to suck two opposite sides of the package bag 22, holding the package bag 22 in position and opening the open side of the package bag 22.

The first clamping unit 231 and the first sealing unit 251 are disposed adjacent to each other. Further, the first sealing unit 251 is disposed at a relatively lower elevation than the first clamping unit 231 so that the first sealing unit 251 is disposed in an offset manner relative to the first clamping unit 231, avoiding direct contact between the package bag 22 and the first sealing unit 251 to cause thermal damage to the package bag 22 when the package bag 22 is being moved over the first clamping unit 231.

After the package bag 22 is transferred to a predetermined location, the first bracket 211 moves the first clamping unit 231 and the first sealing unit 251 toward the second bracket 213, and the second bracket 213 moves the second clamping unit 233 and the second sealing unit 253 toward the first bracket 211 till that the first clamping unit 231 and the second clamping unit 233 clamp the package bag 22 therebetween, as shown in FIG. 4B.

As soon as the first clamping unit 231 and the second clamping unit 233 clamp the package bag 22 therebetween, they are stopped, holding the package bag 22 in place, avoiding the package bag 22 from being stretched and effectively reducing the chance of damage.

After the first clamping unit 231 and the second clamping unit 233 clamp the package bag 22 therebetween, the first drive unit 271 drives the first sealing unit 251 to move toward the second sealing unit 253 and/or the second bracket 213 to the position where the first sealing unit 251 is kept equal to or above the elevation of the first clamping unit 231. The first sealing unit 251 and the second sealing unit 253 can touch the package bag 22 therebetween and heat the package bag 22, finishing the sealing of the package bag 22, as shown in FIG. 4C.

The first drive unit 271 will drive the first sealing unit 251 to move toward the second sealing unit 253 to seal the package bag 22 only after the first clamping unit 231 and the second clamping unit 233 clamped the package bag 22.

During the operation of the first drive unit 271 to move the first sealing unit 251, for example, to extend out or retract the first sealing unit 251, the first clamping unit 231 and the second clamping unit 233 are immovable, holding the package bag 22 in position and keeping the package bag sealing position in line with the center line 221 of the package bag 22, and thus, the package bag 22 will not be stretched by the first clamping unit 231 and the second clamping unit 233.

Further, in one embodiment, after the first sealing unit 251 and the second sealing unit 253 sealed the package bag 22, the second drive unit 273 is controlled to drive the cutter 29 toward the first bracket 211, forcing the cutter 29 to cut the package bag 22.

Figure 5:
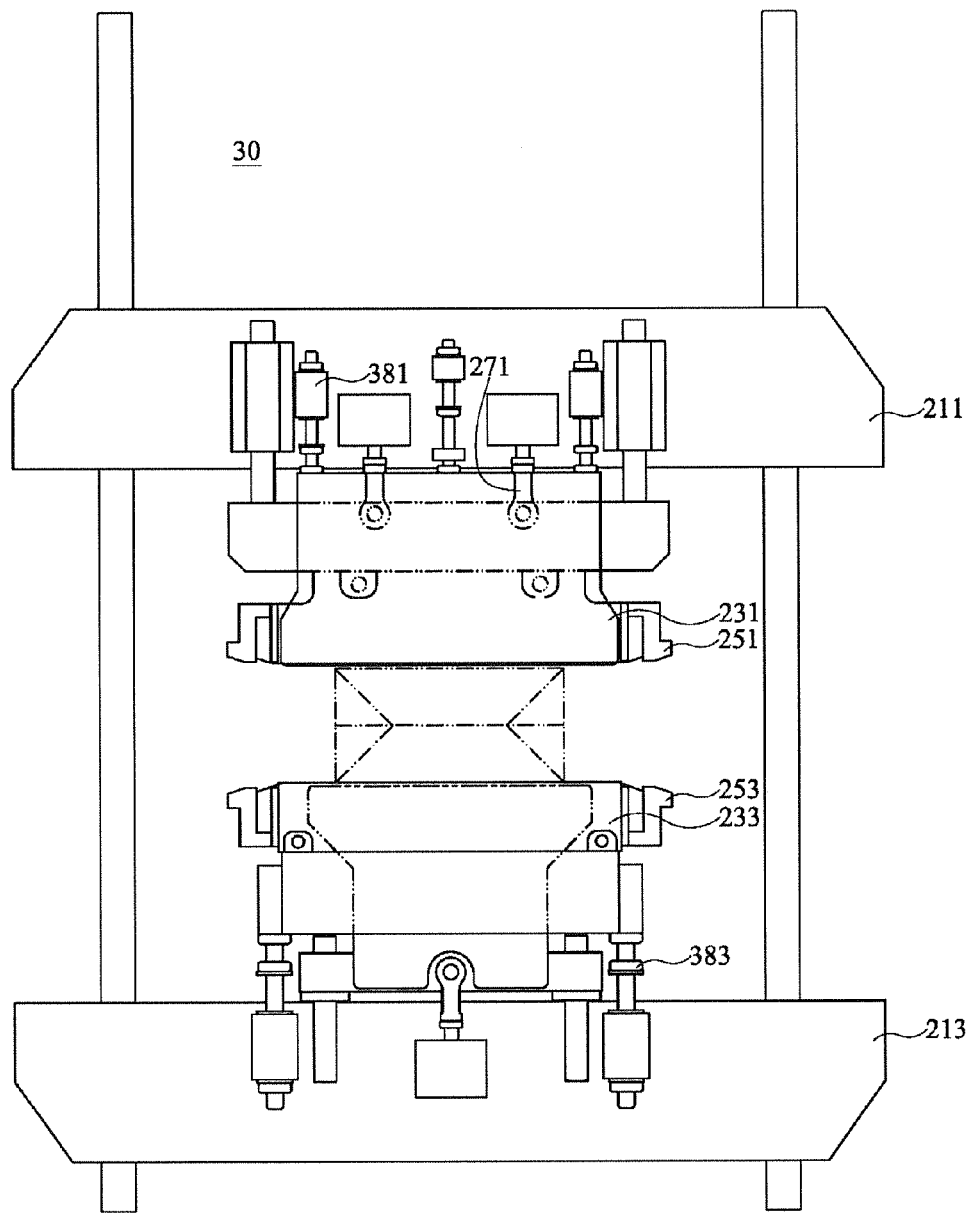
FIG. 5 is a schematic front view of a package bag sealing machine in accordance with a second embodiment of the present invention.

Referring to FIG. 5, a schematic front view of a package bag sealing machine in accordance with a second embodiment of the present invention is shown. As illustrated, the package bag sealing machine 30 comprises a first bracket 211, a second bracket 213, a first clamping unit 231, a second clamping unit 233, a first sealing unit 251, a second sealing unit 253, a first drive unit 271 and at least one first buffer unit 381.

The first bracket 211 and the second bracket 213 are arranged facing toward each other and movable relative to each other. The first clamping unit 231 and the second clamping unit 233 are arranged facing toward each other. Further, the first clamping unit 231 is connected to the first bracket 211. Further, the second clamping unit 233 is connected to the second bracket 213.

In one embodiment, the first clamping unit 231 is connected to the first bracket 211 through the first buffer unit 381. Further, the first buffer unit 381 can be a pneumatic buffer, spring or hydraulic buffer. When the first clamping unit 231 and the second clamping unit 233 clamp the package bag 22 therebetween, the first buffer unit 381 retracts slightly, thereby protecting the first clamping unit 231 and the second clamping unit 233 against impact damage.

Further, the second clamping unit 233 can be connected to the second bracket 213 through the second connection unit 283, same as that shown in FIG. 3. Alternatively, the second clamping unit 233 can be connected to the second bracket 213 through a second buffer unit 383, as shown in FIG. 5.

It is to be noted that, in the aforesaid two embodiments of the present invention, the word of "connected" means a direct or indirect connection between objects, for example, a connection means can be provided between the objects to be connected.

It is to be noted that, the terminologies shown throughout the specification of the present invention are used to describe specific embodiments, not intended for use as limitations of the invention. Further, any single quantifier (a or one) shown throughout the specification of the present invention), unless specifically specified, can also be a plurality of. For example, a device indicated in the specification can be a combination of multiple devices; a component indicated in the specification can be a combination of multiple components.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A package bag sealing machine, comprising:
 a first bracket;
 a second bracket facing toward said first bracket;
 a first clamping unit connected to said first bracket;
 a second clamping unit connected to said second bracket and facing toward said first clamping unit for clamping a package bag between said first clamping unit and said second clamping unit;
 a first sealing unit;
 a second sealing unit connected to said second bracket or said second clamping unit and facing toward said first sealing unit; and
 at least one first drive unit movably connecting said first sealing unit to said first bracket, said first sealing unit being thereby movable relative to said first bracket and said second sealing unit.

2. The package bag sealing machine as claimed in claim 1, further comprising at least one first buffer unit adapted to connect said first clamping unit and said first bracket.

3. The package bag sealing machine as claimed in claim 2, further comprising at least one second buffer unit adapted to connect said second clamping unit and said second bracket.

4. The package bag sealing machine as claimed in claim 1, further comprising at least one sliding rail adapted to support said first bracket and said second bracket, enabling said first bracket and said second bracket to be moved along said sliding rail.

5. The package bag sealing machine as claimed in claim 1, further comprising at least one sliding rail adapted to connect said first bracket and said first sealing unit, enabling said first sealing unit to be moved along said sliding rail relative to said first bracket.

6. The package bag sealing machine as claimed in claim 1, wherein said first clamping unit and said first sealing unit are disposed adjacent to each other, and said first sealing unit is disposed below the elevation of said first clamping unit.

7. The package bag sealing machine as claimed in claim 6, wherein said first drive unit is controllable to move said first sealing unit toward said second sealing unit to the extent wherein said first sealing unit is disposed equal to or above the elevation of said first clamping unit.

8. The package bag sealing machine as claimed in claim 1, further comprising at least one connection unit adapted to connect said first clamping unit and said first bracket.

9. The package bag sealing machine as claimed in claim 1, further comprising at least one suction unit located at said first clamping unit and said second clamping unit.

10. The package bag sealing machine as claimed in claim 1, further comprising at least one cutter, and at least one second drive unit connecting said at least one cutter to said second bracket.

11. The package bag sealing machine as claimed in claim 1, wherein said first drive unit is controllable to move said first sealing unit toward said second sealing unit and to seal a package bag between said first sealing unit and said second sealing unit after said first clamping unit and said second clamping unit clamp a package bag therebetween.

* * * * *